(12) United States Patent
Schiegg et al.

(10) Patent No.: US 11,078,857 B2
(45) Date of Patent: Aug. 3, 2021

(54) CALCULATION OF EXHAUST EMISSIONS OF A MOTOR VEHICLE

(71) Applicant: Robert Bosch GmbH, Stuttgart (DE)

(72) Inventors: Martin Schiegg, Korntal-Muenchingen (DE); Heiner Markert, Stuttgart (DE); Stefan Angermaier, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/754,321

(22) PCT Filed: Oct. 9, 2018

(86) PCT No.: PCT/EP2018/077474
§ 371 (c)(1),
(2) Date: Apr. 7, 2020

(87) PCT Pub. No.: WO2019/076685
PCT Pub. Date: Apr. 25, 2019

(65) Prior Publication Data
US 2020/0240346 A1 Jul. 30, 2020

(30) Foreign Application Priority Data

Oct. 16, 2017 (DE) .......................... 102017218476.0

(51) Int. Cl.
*F02D 41/14* (2006.01)
*G01M 15/05* (2006.01)
(Continued)

(52) U.S. Cl.
CPC ........ *F02D 41/1444* (2013.01); *F01N 11/007* (2013.01); *F02B 77/086* (2013.01);
(Continued)

(58) Field of Classification Search
CPC ............. F02D 41/1405; F02D 41/1452; F02D 41/1453; F02D 41/1458; F02D 41/1462;
(Continued)

(56) References Cited

U.S. PATENT DOCUMENTS

| 6,550,451 B1 * | 4/2003 | Muller ................ F02D 41/0062 123/406.45 |
| 7,685,871 B2 * | 3/2010 | Sinnamon ........... G01M 15/106 73/114.69 |

(Continued)

FOREIGN PATENT DOCUMENTS

| DE | 102008057494 A1 | 7/2009 |
| DE | 102009028374 A1 | 2/2011 |

(Continued)

OTHER PUBLICATIONS

International Search Report for PCT/EP2018/077474, dated Feb. 27, 2019.

*Primary Examiner* — Erick R Solis
(74) *Attorney, Agent, or Firm* — Norton Rose Fulbright US LLP; Gerard Messina

(57) ABSTRACT

A method for ascertaining emissions of a motor vehicle driven with the aid of an internal combustion engine in a practical driving operation. A machine learning system is trained to generate time curves of the operating variables with the aid of measured time curves of operating variables of the motor vehicle and/or of the internal combustion engine, and to then ascertain the emissions as a function of these generated time curves.

21 Claims, 6 Drawing Sheets

(51) Int. Cl.
  *G01M 15/10* (2006.01)
  *F01N 11/00* (2006.01)
  *F02B 77/08* (2006.01)
  *F02D 41/28* (2006.01)
  *G05B 13/02* (2006.01)
  *G06N 3/08* (2006.01)

(52) U.S. Cl.
  CPC ..... *F02D 41/1405* (2013.01); *F02D 41/1439* (2013.01); *F02D 41/1452* (2013.01); *F02D 41/1453* (2013.01); *F02D 41/1458* (2013.01); *F02D 41/1462* (2013.01); *F02D 41/1465* (2013.01); *F02D 41/28* (2013.01); *G01M 15/05* (2013.01); *G01M 15/102* (2013.01); *G05B 13/027* (2013.01); *G05B 13/029* (2013.01); *G06N 3/088* (2013.01); *F02D 2041/1433* (2013.01); *F02D 2041/1437* (2013.01)

(58) Field of Classification Search
  CPC ......... F02D 41/1465; F02D 2041/1433; F02D 2041/1437; G01M 15/05; G01M 15/102; G05B 13/027; G05B 13/029
  USPC .......................... 701/102; 73/114.71, 114.72
  See application file for complete search history.

(56) References Cited

U.S. PATENT DOCUMENTS

| | | | |
|---|---|---|---|
| 8,301,356 B2 * | 10/2012 | Wang | F02D 35/026 701/102 |
| 8,453,431 B2 * | 6/2013 | Wang | F02D 41/1405 60/285 |
| 9,708,991 B2 * | 7/2017 | Larimore | F02D 41/0062 |
| 2013/0184974 A1 * | 7/2013 | Shieh | F02D 35/02 701/106 |

FOREIGN PATENT DOCUMENTS

| | | |
|---|---|---|
| DE | 102016200782 A1 | 7/2017 |
| DE | 102017107271 A1 | 7/2017 |
| WO | 2013131836 A2 | 9/2013 |

\* cited by examiner

CALCULATION OF EXHAUST EMISSIONS OF A MOTOR VEHICLE

FIELD

The present invention relates to a method and to a device for ascertaining emissions, to a computer program and to a machine-readable memory medium.

BACKGROUND INFORMATION

A method for diagnosing an internal combustion engine is described in German Patent Application No. DE 10 2009 028 374 A1, which is limited by the fact that only particular load states of the internal combustion engine may be reached on a test bench. It is also described in this document that particular operating points may only be reached via test drives, which results in long diagnostic times.

SUMMARY

An example method in accordance with the present invention may have an advantage over the related art that it is possible to particularly rapidly and simply ascertain emissions of a motor vehicle driven with the aid of an internal combustion engine in a practical driving operation. Advantageous refinements of the present invention are described herein.

SUMMARY

In some countries, legislation provides for the registration of new motor vehicles driven with the aid of an internal combustion engine to be made dependent on the emissions that result in practical driving operation. The English expression real driving emissions is also commonly used in this case. Such motor vehicles include, for example, those that are driven exclusively by an internal combustion engine, but also those that include a hybridized power train.

For this purpose, it is provided that a tester performs one driving cycle or multiple driving cycles with the motor vehicle and that the resultant emissions are measured. The registration of the motor vehicle is then dependent on these measured emissions. The driving cycle in this case may be freely selected by the tester within broad limits. A typical duration of a driving cycle in this case may, for example, be 90 to 120 minutes.

Motor vehicle manufacturers are therefore faced with the challenge in the development of motor vehicles of having to foresee early in the development process of a new motor vehicle whether or not the emissions of this motor vehicle remain within the legally prescribed limits in each admissible driving cycle.

It is therefore important to provide a device, which is able to safely predict the anticipated emissions of the motor vehicle already in the developmental stage of a motor vehicle, in order to be able to implement changes in the motor vehicle in the event of an anticipated exceedance of limiting values. Such an estimation based solely on measurements on a test bench or in a driving motor vehicle is extremely cumbersome due to the wide variety of possible driving cycles.

In a first aspect, therefore, the present invention relates to a method for ascertaining emissions of a motor vehicle driven with the aid of an internal combustion engine in a practical driving operation, a machine learning system being trained to generate time curves (x') of operating variables of the internal combustion engine and/or of the motor vehicle with the aid of measured time curves (x) of operating variables of the internal combustion engine and/or of the vehicle, and to then ascertain the emissions as a function of these generated time curves (x').

This means, it is possible to measure only actual time curves of the operating variables, each of which exhibits unique characteristics and then to have realistic time curves generated by the machine learning system, which exhibit a plurality of these characteristics.

The operating variables may preferably include one, some or all of the variables, which characterize the following variables:
  an accelerator pedal position of the motor vehicle
  a brake pedal position of the motor vehicle
  a position of the clutch of a transmission of the motor vehicle
  a gear of the transmission
  a speed of the motor vehicle
  a driving resistance of the motor vehicle
  a tractive force of the internal combustion engine
  a tractive force of an electromotive drive of the motor vehicle
  a rotational speed of the internal combustion engine
  an air mass intake per unit time of the internal combustion engine
  a pressure in an intake manifold of the internal combustion engine
  a quantity of the high-pressure EGR
  a quantity of the low-pressure EGR
  a timing of the closing of the inlet valve
  a timing of the opening of the outlet valve
  a maximum valve lift of the inlet valve
  a maximum valve lift of the outlet valve
  a position of the system for changing the compression of the internal combustion engine
  a fuel quantity of injections of the internal combustion engine
  an injection timing of the injections
  a pressure in a fuel high-pressure accumulator, as it is also known in Germany, for example, by the English term common rail, of the internal combustion engine
  a coolant temperature of the internal combustion engine
  a temperature in the intake system of the internal combustion engine.

In addition to the time curves of the operating variables, it is also possible for [a machine learning system] to be trained to generate time curves (x') of operating variables as a function of parameters, which characterize the internal combustion engine and/or the motor vehicle in the cycle to be completed.

These characterizing parameters may include one, some or all of the following variables:
  a mass of the motor vehicle
  a transmission ratio of the motor vehicle
  a maximum drive power of a drive system of the motor vehicle
  a maximum torque of the drive system
  a type of transmission
  a type of fuel
  a specification of the hybridization
  a type designation of the engine
  a type designation of the vehicle
  a characterization of the route driven, for example, GPS recordings, ambient temperature, ambient pressure, etc.

The injections may be, in particular, multiple injections, for example, a main injection, pilot injection or post-injection. In the case of such multiple injections, those of the motor vehicle and/or of the internal combustion engine preferably include variables, which characterize each of the partial injections depending on the fuel quantity and injection timing.

The use of a machine learning system is important because the number of possible time curves is very large. A time curve of 1 hour in duration and a sampling rate of, for example, 100 ms, given 15 operating variables of the motor vehicle and/or of the internal combustion engine, results in a 15×36,000=540,000 dimensional space, in which possible time curves lie.

For those skilled in the art, it is understood that, comparatively speaking, only a small number of points in this very high-dimensional space correspond to actual possible time curves of the operating variables of the motor vehicle and/or of the internal combustion engine, i.e., are realistic. The problem in selecting these realistic time curves is solved using an example embodiment of the present invention.

In one refinement of the present invention, it may be provided that the machine learning system includes a first part—a coder—, which initially transforms the measured time curves (x) in first variables (z, $q_\theta(z|x)$), each of which characterizes latent variables (z), a space of latent variables having a reduced dimensionality—compared to the space of the measured time curves, and the machine learning system including a second part—a decoder—which generates as a function of latent variables (z) second variables (x', $p\phi(x'|z)$), each of which characterizes generated time curves (x') of the operating variables of the motor vehicle and/or of the internal combustion engine.

By mapping the actually measured trajectories on a low-dimensional space, the machine learning system is trained to extract the essential features, the realistic time curves—i.e., in particular, the curves included in the training data of the measured time curves. The essence of realistic trajectories is thus coded in parameters that characterize the coder or the decoder.

It is also possible that the coder transforms measured time curves (x) not only into latent variables (z), but also into additional variables as a function of the characterizing parameters.

In this case, it may be provided in one particularly advantageous refinement of the present invention that the first variables, which characterize latent variables (z), are latent variables (z) themselves and the second part including a Gaussian process model parameterized by third parameters (γ), and third parameters (γ) as well as latent variables (z) are adapted during the training of the machine learning system in such a way that a marginal probability (p(x|z)) of the reconstruction of measured time curves (x) is maximized below these latent variables (z).

The use of the Gaussian process model has the advantage that a probabilistic statement is possible about whether or not a respective second variable (z) corresponds to a curve that includes the same characteristics as measured curves (x). In this way, it is possible to assess for arbitrary test cycles based on the corresponding associated curves of operating variables of the motor vehicle and/or of the internal combustion engine whether or not the curves are relevant in view of the measured curves that were incorporated into the training phase.

In one refinement of this aspect of the present invention, it may be provided that the first part includes a function parameterized by fourth parameters (v) such as, for example, a neural network, and the adaptation of latent variables (z) occurs during the training by adapting fourth parameters (v).

This is a particularly efficient way of mapping measured curves (x) of the operating variables of the motor vehicle and/or of the internal combustion engine onto latent variables (z).

In one alternative, particularly advantageous refinement of the present invention, it may be provided that first part and second part of the machine learning system form an autoencoder.

An autoencoder means that the first variables, which characterize latent variables (z), are the latent variables themselves, that the second variables, which characterize the generated time curves are the generated time curves themselves. The first part and the second part may, for example, be provided by neural networks.

This method has the advantage that the training of the machine learning system is particularly simple. For this purpose, it is possible, in particular, to adapt parameters, which parameterize the autoencoder, in such a way that a cost function that includes a reconstruction error, which characterizes, for example, a standard $|x-x'|^2$ of a difference between the measured time curves and time curves (x') generated from these with the aid of the autoencoder, is minimized.

In a further alternative particularly advantageous refinement, it may be provided that the first part and the second part of the machine learning system form a variational autoencoder. Variational encoders are known in German by the English term variational autoencoder.

This means that the first variables, each of which characterizes latent variables (z), are each a first probability distribution ($q_\theta(z|x)$) parameterized as a function of first parameters (0), and the second variables, which characterize the generated time curves, are each a second probability distribution ($p_\phi(x'|z)$) parameterized by second parameters (ϕ)). The training of the machine learning system then means that first parameters (0) and second parameters (ϕ)) are varied in such a way that a cost function is minimized. The cost function in this case advantageously includes a reconstruction error of a generated reconstruction of the measured time curves and a Kullback-Leibler divergence $KL[q(z)\|N]$ between first probability distributions ($q_\theta(z|x)$) and a standard distribution N standardized preferably to an average value 0 and a variance 1.

A parameterizable distribution function, for example, a standard distribution, may be used in each case as first probability distribution ($q_\theta(z|x)$) and/or as second probability distribution ($p_\phi(x'|z)$). The first and/or the second part may then each include a neural network, for example, which ascertains parameters as a function of the input variables fed to it, which parameterize this parameterizable distribution function.

The use of the variational autoencoder has the advantage that the first probability distribution ($q_\theta(z|x)$) allows for a probabilistic statement about whether or not a respective second variable (x) has the same characteristics as the measured curves.

In still a further alternative particularly advantageous refinement of the present invention, it may be provided that the first variables, which characterize latent variables (z) are latent variables (z) themselves, and the first part ascertains from measured time curves (x) with the aid of a sparse dictionary learning method latent variables (z), which represent coefficients of respective measured time curves (x) in the representation as linear combinations of the dictionary learned with the aid of this method. In this way, it is possible to particularly effectively reduce the space of latent variables (z).

In one advantageous refinement of the aforementioned aspects of the present invention, it may be provided that latent variables (z) are predefined and the machine learning system generates time curves (x') of operating variables of the motor vehicle and/or of the internal combustion engine as a function of these predefined latent variables (z), and the emissions are then ascertained as a function of these generated time curves.

This means that the machine learning system is initially trained with the aid of measured time curves to be able to generate realistic time curves. By specifying the latent variables, time curves are then generated, for which emissions are then ascertained, for example, using a suitable mathematical model such as, for example, a machine learning method or a physical-chemical model. It may also be provided to measure the emissions on a real system in order, for example, to thereby train the aforementioned machine learning method.

In one refinement of this aspect of the present invention, it may be provided that the at least some, preferably all, of latent variables (z) will be ascertained with the aid of a method of statistical test planning.

This is particularly good if the mathematical model with which the emissions are ascertained is to be adapted to actual measured emission values as a function of the ascertained emissions. In this way, it may be ensured that preferably wide areas of the space of the latent variables are preferably efficiently explored.

In one alternative refinement of this aspect of the present invention, it may be provided that a probability density distribution of latent variables (z) resulting as a function of the measured time curves is ascertained, and predefined latent variables (z) are drawn as a random sample from this estimated probability density distribution.

The result achievable thereby is that the ascertained emissions are particularly representative of the emissions occurring during the actual operation of the motor vehicle. In this way it is possible to particularly accurately estimate the emissions occurring during the actual operation of the motor vehicle.

It is then additionally also possible that the additional variables are predefined. This is particularly advantageous if time curves (x') are to be generated, which are to be conditional on at least one predefinable property. Time curves (x') may thus be generated, for example, which are generated, limited to the aforementioned characterizing parameters, i.e., for example, vehicle types or geographical locations, by predefining these characterizing parameters as additional variables.

In order to train such a machine learning system, the additional parameters, which are to code the predefinable properties of time curve (x') generated during the training, are set to the true value during the training (because this property of the time curve is, of course, known at the training times).

In another aspect of the present invention, it may be provided that the machine learning system includes a first part—a discriminator—to which either measured time curves of operating variables of the motor vehicle and/or of the internal combustion engine, or time curves of the motor vehicle and/or of the internal combustion engine generated by a second part of the machine learning system—a generator—are fed, the first part being trained to be able to preferably readily decide whether it is fed a measured or a generated time curve of operating variables of the motor vehicle and/or of the internal combustion engine, the second part being trained to generate time curves of operating variables of the motor vehicle and/or of the internal combustion engine as a function of randomly selected input variables in such a way that the first part is preferably able to only poorly decide whether it is fed a measured or a generated time curve of operating variables of the motor vehicle and/or of the internal combustion engine.

This example method has the advantage that the curves of operating variables of the motor vehicle and/or of the internal combustion engine generated in this way are particularly realistic.

The meaning of the word "random" in this case may include the variables thus selected being ascertained with the aid of a real random number generator or with the aid of a pseudo-random generator.

The training of the first part and of the second part may advantageously be mutually carried out, in order to ensure that the training is preferably effective. In this case, the training may be advantageously continued until the discriminator is no longer able to decide with predefinable accuracy whether the time curves fed to it are measured time curves or time curves generated by the generator.

In one refinement of this aspect of the present invention, it may be provided that randomly selected input variables are predefined and that the machine learning system generates time curves (x') of the operating variables of the motor vehicle and/or of the internal combustion engine as a function of these predefined input variables, and the emissions are then ascertained as a function of these generated time curves.

This means, the machine learning system is initially trained with the aid of measured time curves to be able to generate realistic time curves. By specifying the randomly selected input variables (z), actual time curves are then generated, for which emissions are then ascertained, for example, using a suitable mathematical model such as, for example, a machine learning method or a physical-chemical model. It may also be provided to measure the emissions on a real system in order, for example, to thereby train the aforementioned machine learning method. By specifying the additional variables, it is possible to generate curves that correspond to the predefined properties.

In this case, it may, in particular, be provided that the randomly selected input variables are ascertained with the aid of a method of statistical test planning.

This is particularly good if the mathematical model with which the emissions are ascertained is to be adapted to actual measured emission values as a function of the ascertained emissions. In this way, it may be ensured that preferably wide areas of the space of the latent variables are preferably rapidly explored.

Finally, it is also possible to carry out the ascertainment of the emissions with the aid of a trained model while the motor vehicle is being operated. It is then possible for the motor vehicle to be controlled as a function of the ascertained emissions. Thus, the ascertainment of the emissions with the aid of the machine learning system then functions as a virtual sensor, which saves costs, is particularly fail-safe and may be used, in particular, in a predictive manner. It is then possible, for example, to reduce a power of the internal combustion engine or to change a fuel/air ratio as a function of the ascertained emissions, for example, if the motor vehicle enters a zone, in which specific, in particular, stringent limiting values are present for the emissions. This is possible, for example, in inner cities.

In further aspects, the present invention relates to a computer program, which is configured to carry out one of the aforementioned example methods when it is executed on a computer, a machine-readable memory medium on which this computer program is stored (this memory medium capable of being spatially distributed of course, for example, in a parallel design distributed across multiple computers) and a device, in particular, a monitoring unit, which is configured to carry out one of these methods (for example, by playing back the aforementioned computer program).

Specific embodiments of the present invention are explained in greater detail below with reference to the figures.

DETAILED DESCRIPTION OF EXAMPLE EMBODIMENTS

Figure 1:
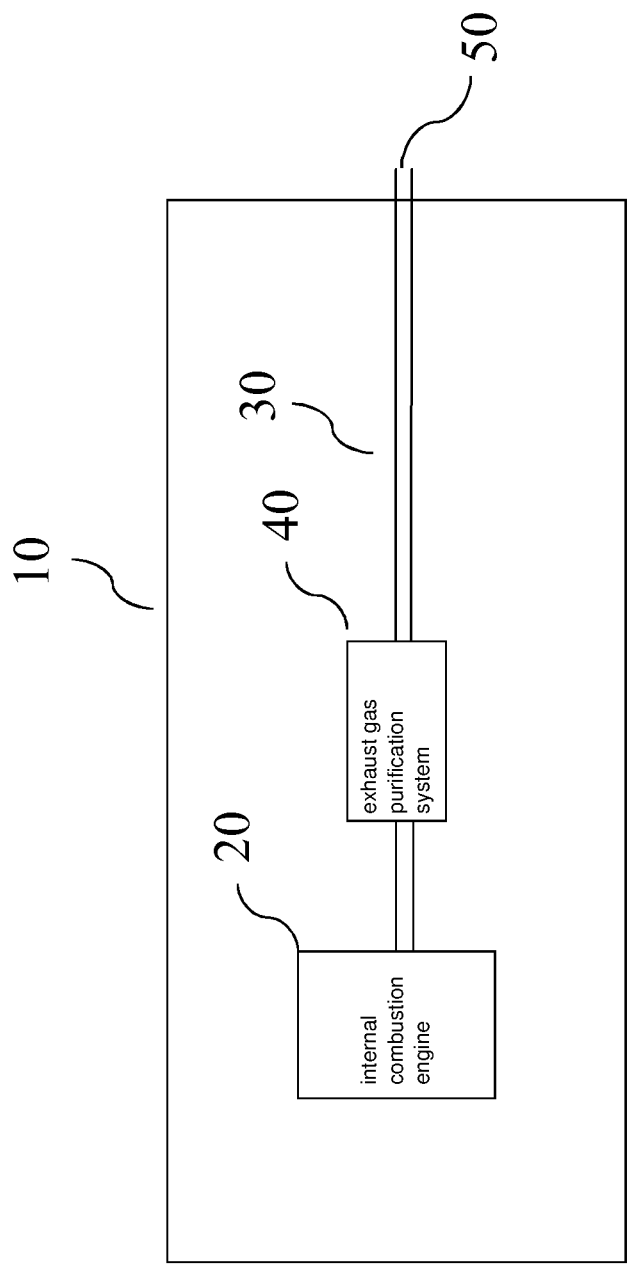
FIG. 1 shows a structure of a motor vehicle.

FIG. 1 shows by way of example a structure of a motor vehicle 10. The motor vehicle is driven by an internal combustion engine 20. Combustion products forming during the operation of internal combustion engine 20 are conducted through an exhaust system 30, which includes, in particular, an exhaust gas purification system 40, for example, a catalytic converter. At the end of exhaust system 30, emissions 50, in particular, nitrogen oxide, soot particles and carbon dioxide, escape into the environment.

Figure 2:
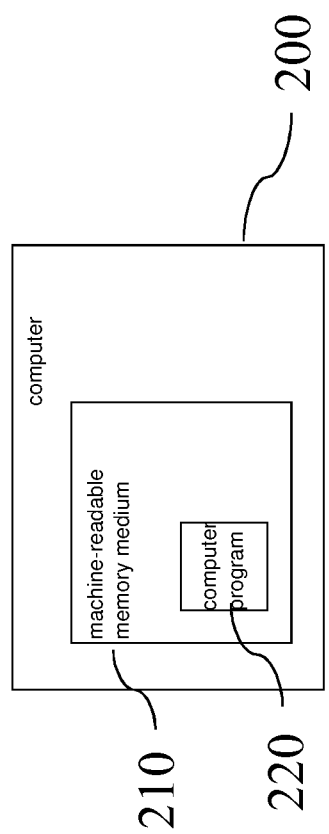
FIG. 2 shows a device for ascertaining the emissions.

FIG. 2 shows by way of example a structure of a device 200, with which emissions 50 of motor vehicle 10 may be ascertained in a practical driving operation. Device 200 in the exemplary embodiment is a computer, which includes a machine-readable memory medium 210, on which a computer program 220 is stored. This computer program is configured to carry out the method according to the present invention, i.e., computer program 220 includes instructions which prompt computer 200 to carry out the method according to the present invention when computer program 220 is executed on computer 200.

Figure 3:
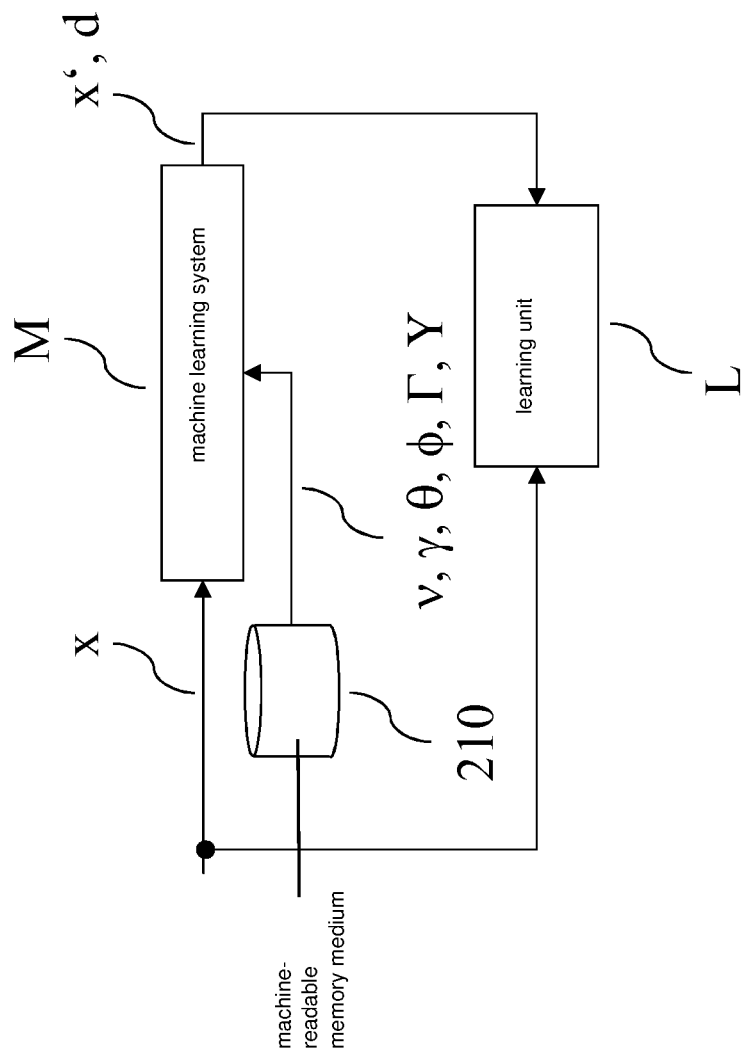
FIG. 3 shows by way of example, a structure of a device for training the machine learning system.

FIG. 3 shows by way of example a structure of a device for training machine learning system (M). Machine learning system (M) is fed measured time curves (x) of operating variables of motor vehicle 10 and/or of internal combustion engine 20 as input variables. These measured time curves need not originate from the same motor vehicle and may, for example, be stored in a database. As a function of parameters (v, γ, θ, φ, Γ, Y), which are stored on machine-readable memory 210, machine learning system (M) generates from these an output variable, namely, either time curves (x') of the operating variable or a discrimination result (d). Measured time curves (x) and generated time curves (x') or, alternatively, discrimination result (d) are fed to a learning unit (L), which adapts parameters (v, γ, θ, φ, Γ, Y), for example, with the aid of a gradient descent method, in such a way that a cost function is optimized.

Figure 4:
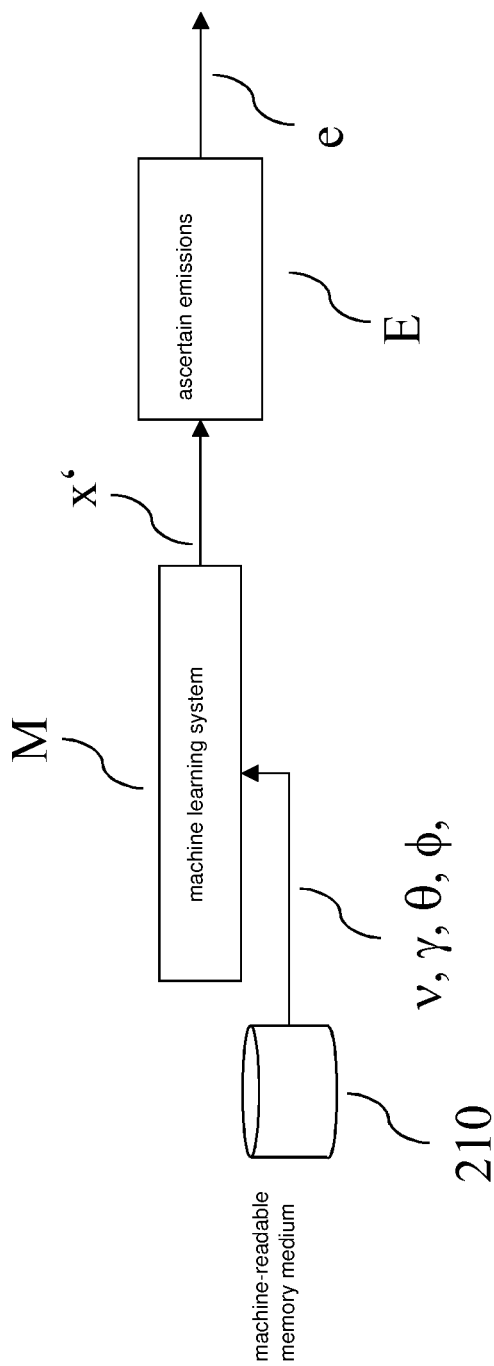
FIG. 4 shows by way of example a use of the machine learning system for ascertaining emissions.

FIG. 4 shows by way of example, a use of machine learning system (M) for ascertaining emissions (e). Machine learning system (M) generates time curves (x') of operating variables of motor vehicle 10 and/or of internal combustion engine 20 as a function of parameters (v, γ, θ, φ). These parameters are fed to a block (E), which ascertains therefrom associated emissions (e) with the aid of a mathematical model or of real measurements in motor vehicle 10.

Figure 5:
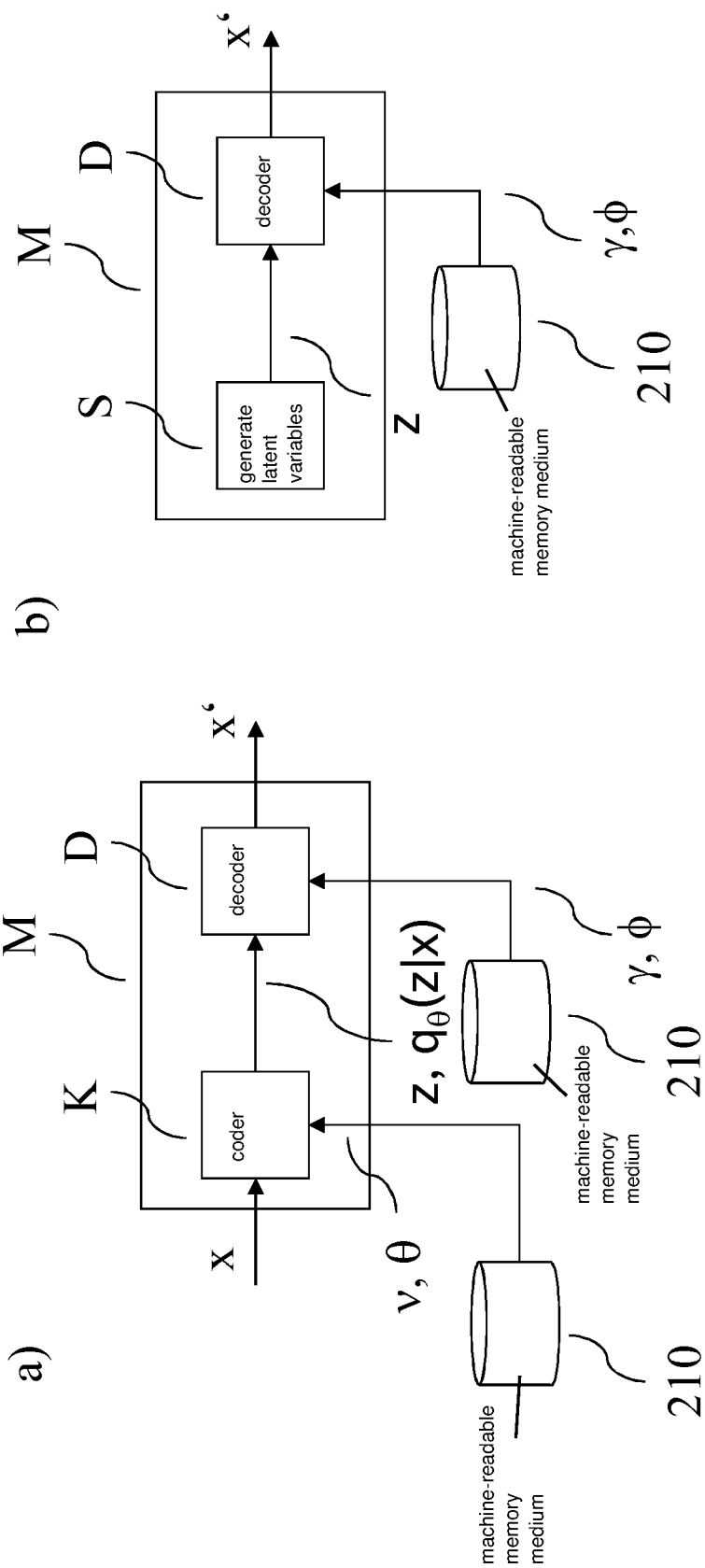
FIG. 5 shows an exemplary structure of the machine learning system.

FIG. 5 shows in greater detail an exemplary structure of machine learning system (M). FIG. 5a shows the structure as it may be used during the training. Machine learning system (M) includes a coder (K) and a decoder (D). Coder (K) ascertains variables (z, $q_\theta(z|x)$), which characterize latent variables (z), from measured time curves (x) and parameters (v, θ) fed to it, and variables are fed in turn to a decoder (D). In addition to latent variables (z), decoder (d) may also be fed further variables (not shown). Decoder (D) decodes generated time curves (x') from these variables (z, $q_o(z|x)$) and as a function of parameters (γ, φ) and, if necessary, of the additional variables.

FIG. 5b shows the structure as it may be used during the generation of generated time curves (x'). A block (S) generates latent variables (z) according to a predefinable distribution. A probability density is ascertained, for example, with the aid of a density estimator as a function of ascertained latent variables z as shown in FIG. 5a, from which block (S) then randomly draws a sample. These generated latent variables (z) are then fed to decoder (D), which generates generated time curves (x'), in this case, as a function of parameters (γ, φ).

Coder (K) and decoder (D) in this case may form an autoencoder, for example, or a variational autoencoder, or implement a sparse dictionary learning.

It is also possible in this case that decoder (D) includes a Gaussian process. Then it is possible either that coder (K) includes a neural network, which ascertains latent variables (z) as a function of parameters (v), these parameters (v) also being varied during the training in addition to parameters (γ), which characterize the Gaussian process, in such a way that a marginal probability (p(x|z)) of the reconstruction of measured time curves (x) is maximized below these latent variables (z). Or, it is possible that coder (K) is omitted and latent variables (z) are directly predefined, so that in addition to parameters (γ), learning unit (L) also adapts these latent variables (z) in such a way that a cost function, which includes a reconstruction error between measured time curve (x) and associated curve (x') generated from the selected latent variables (z), is minimized.

Figure 6:
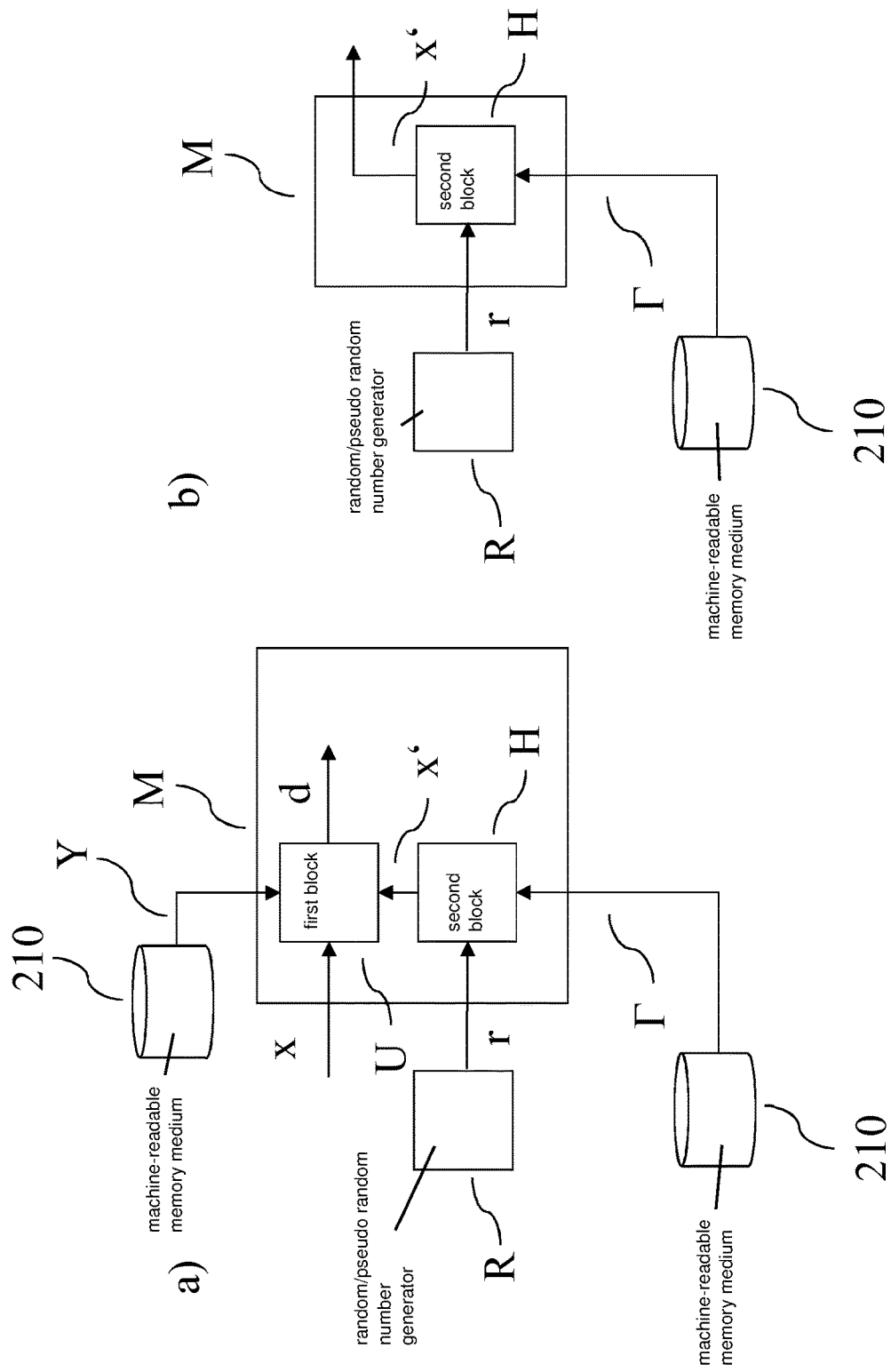
FIG. 6 shows an alternative exemplary structure of the machine learning system.

FIG. 6 shows a more detailed alternative exemplary structure of machine learning system (M). FIG. 6a shows the structure as it may be used during the training. Machine learning system (M) includes a first block (U) and a second block (H). First block (U) is parameterized by parameters (Y), second block (H) is parameterized by parameters (Γ). A random number generator (R) ascertains random numbers (or as is frequently common, pseudo-random numbers) (r) and feeds these to second block (H). Second block (H) may also be fed additional variables (not shown), which code characterizing parameters. Second block (H) generates in each case a generated time curve (x') from random numbers (r) and, if necessary, from the additional variables as a function of parameters (Γ).

Such generated time curves (x') and measured time curves (x) are fed alternatingly to first block (U), i.e., first block (U) is fed either a generated time curve (x') or a measured time curve (x). It is also possible that first block (U) is fed both these curves (x, x') if first block (U) has an internal selection mechanism (not shown), which in each case selects one of these two curves (x, x').

First block (U) is trained as shown in FIG. 3 by adapting parameters (Y) which determine its behavior, to be able to preferably readily distinguish whether the variable fed to it is a measured time curve (x) or a generated time curve (x'). The information whether this classification of first block (U) is correct or incorrect is coded in discrimination result (d).

First block (U) and second block (H) are then mutually trained, parameters (Y) of first block (U) being trained that the classification of first block (U) is preferably often correct and parameters (Γ) of second block (H) being trained that the classification of first block (U) is preferably often incorrect.

FIG. 6b shows the corresponding structure as it may be used for generating generated time curves (x'). Random number generator (R) generates random numbers or pseudo-random numbers (r), and second block (H) generates as a function thereof and, if necessary, as a function of the additional variables, generated time curves (x') with the aid of parameters (Γ) adapted during the training.

What is claimed is:

1. A computer-implemented method for ascertaining emissions of a motor vehicle driven using an internal combustion engine in a driving operation, the method comprising the following steps:
    training a machine learning system to generate time curves, of operating variables of the internal combustion engine and/or of the motor vehicle, using measured time curves of the operating variables of the internal combustion engine and/or of the motor vehicle;
    generating, by the machine learning system, the time curves of the operating variables;
    ascertaining the emissions as a function of the generated time curves generated by the machine learning system; and
    controlling the motor vehicle as a function of the ascertained emissions.

2. The method as recited in claim 1, wherein the machine learning system includes a first part which initially transforms the measured time curves into first variables, each of which characterizes latent variables, a space of the latent variables having a reduced dimensionality as compared to a space of the measured time curves, and the machine learning system includes a second part which generates, as a function of the latent variables, second variables, each of which characterizes the generated time curves of the operating variables.

3. The method as recited in claim 2, wherein the first variables, which characterize the latent variables, are the latent variables themselves, and the second part includes a parameterized Gaussian process model parameterized by third parameters, and the third parameters and the latent variables are adapted during the training of the machine learning system in such a way that a marginal probability of a reconstruction of the measured time curves is maximized below these latent variables.

4. The method as recited in claim 3, wherein the first part includes a neural network parameterized by fourth parameters, and the adaptation of the latent variables occurs during the training by adapting the fourth parameters.

5. The method as recited in claim 2, wherein the first part and the second part of the machine learning system form an autoencoder.

6. The method as recited in claim 2, wherein the first part and the second part of the machine learning system form a variational autoencoder.

7. The method as recited in claim 2, wherein the first variables, which characterize the latent variable, are the latent variables themselves, and the first part ascertains the latent variables from the measured time curves using a sparse dictionary learning method, which variables represent coefficients of the measured time curves in a representation as a linear combination of the dictionary learned using this method.

8. The method as recited in claim 1, wherein latent variables are predefined and the machine learning system generates the time curves of the operating variables as a function of the predefined latent variables, and the emissions are then ascertained as a function of the generated time curves.

9. The method as recited in claim 8, wherein the latent variables are ascertained using a method of statistical test planning.

10. The method as recited in claim 8, wherein a probability density distribution of the latent variables resulting as a function of the measured time curves is ascertained and the predefined latent variables are drawn as a random sample from the estimated probability density distribution.

11. The method as recited in claim 1, wherein the machine learning system includes a first part to which either the measured time curves of the operating variables or time curves of the operating variables generated by a second part of the machine learning system are fed, the first part being trained during the training of the machine learning system to decide whether it is fed a measured time curve of the operating variables or a generated time curve of the operating variables, and the second part being trained during the training of the machine learning system to generate the time curves of the operating variables as a function of randomly selected input variables.

12. The method as recited in claim 11, wherein the second part is trained during the training of the machine learning system to generate the time curves of the operating variables as the function of the randomly selected input variables in such a way that the first part is able to only poorly decide whether it is fed the measured time curve or the generated time curve of the operating variables.

13. The method as recited in claim 11, wherein randomly selected input variables are predefined and the machine learning system generates the time curves of the operating variables as a function of the randomly selected input variables, and the emissions are then ascertained as a function of the generated time curves.

14. The method as recited in claim 13, wherein at least some of the randomly selected input variables are ascertained using a method of statistical test planning.

15. A non-transitory machine-readable memory medium on which is stored a computer program for ascertaining emissions of a motor vehicle driven using an internal combustion engine in a driving operation, the computer program, when executed by a computer, causing the computer to perform the following steps:
    training a machine learning system to generate time curves, of operating variables of the internal combustion engine and/or of the motor vehicle, using measured time curves of the operating variables of the internal combustion engine and/or of the motor vehicle;
    generating, by the machine learning system, the time curves of the operating variables;
    ascertaining the emissions as a function of the generated time curves generated by the machine learning system; and
    controlling the motor vehicle as a function of the ascertained emissions.

16. A computer configured to ascertain emissions of a motor vehicle driven using an internal combustion engine in a driving operation, the computer configured to:

train a machine learning system to generate time curves, of operating variables of the internal combustion engine and/or of the motor vehicle, using measured time curves of the operating variables of the internal combustion engine and/or of the motor vehicle;
generate, by the machine learning system, the time curves of the operating variables;
ascertain the emissions as a function of the generated time curves generated by the machine learning system; and
control the motor vehicle as a function of the ascertained emissions.

17. The non-transitory machine-readable memory medium as recited in claim 15, wherein:
latent variables are predefined and the machine learning system generates the time curves of the operating variables as a function of the predefined latent variables, and the emissions are then ascertained as a function of the generated time curves;
wherein a probability density distribution of the latent variables resulting as a function of the measured time curves is ascertained and the predefined latent variables are drawn as a random sample from the estimated probability density distribution.

18. The computer as recited in claim 16, wherein the machine learning system includes a first part to which either the measured time curves of the operating variables or time curves of the operating variables generated by a second part of the machine learning system are fed, the first part being trained during the training of the machine learning system to decide whether it is fed a measured time curve of the operating variables or a generated time curve of the operating variables, and the second part being trained during the training of the machine learning system to generate the time curves of the operating variables as a function of randomly selected input variables.

19. The method as recited in claim 1, wherein the operating variables include at least one of the following:
(i) an accelerator pedal position of the motor vehicle, and/or
(ii) a brake pedal position of the motor vehicle, and/or
(iii) a position of a clutch of a transmission of the motor vehicle, and/or
(iv) a gear of the transmission, and/or
(v) a speed of the motor vehicle, and/or
(vi) a driving resistance of the motor vehicle, and/or
(vii) a tractive force of the internal combustion engine, and/or
(viii) a tractive force of an electromotive drive, and/or
(ix) a rotational speed of the internal combustion engine, and/or
(x) an airmass intake per unit time of the internal combustion engine, and/or
(xi) a pressure in an intake manifold of the internal combustion engine, and/or
(xii) a quantity of a high-pressure EGR (exhaust gas recirculation), and/or
(xiii) a quantity of a low-pressure EGR, and/or
(xiv) a timing of a closing an inlet valve, and/or
(xv) a timing of an opening of an outlet valve, and/or
(xvi) a maximum valve lift of the inlet valve, and/or
(xvii) a maximum valve lift of the outlet valve, and/or
(xviii) a position of a system for changing a compression of the internal combustion engine, and/or
(xix) a fuel quantity of injections of the internal combustion engine, and/or
(xx) an injection timing of the injections, and/or
(xxi) a pressure in a fuel high-pressure accumulator, and/or
(xxii) a coolant temperature of the internal combustion engine, and/or
(xxiii) a temperature in an intake system of the internal combustion engine.

20. The non-transitory machine-readable memory medium as recited in claim 15, wherein the operating variables include at least one of the following:
(i) an accelerator pedal position of the motor vehicle, and/or
(ii) a brake pedal position of the motor vehicle, and/or
(iii) a position of a clutch of a transmission of the motor vehicle, and/or
(iv) a gear of the transmission, and/or
(v) a speed of the motor vehicle, and/or
(vi) a driving resistance of the motor vehicle, and/or
(vii) a tractive force of the internal combustion engine, and/or
(viii) a tractive force of an electromotive drive, and/or
(ix) a rotational speed of the internal combustion engine, and/or
(x) an airmass intake per unit time of the internal combustion engine, and/or
(xi) a pressure in an intake manifold of the internal combustion engine, and/or
(xii) a quantity of a high-pressure EGR (exhaust gas recirculation), and/or
(xiii) a quantity of a low-pressure EGR, and/or
(xiv) a timing of a closing an inlet valve, and/or
(xv) a timing of an opening of an outlet valve, and/or
(xvi) a maximum valve lift of the inlet valve, and/or
(xvii) a maximum valve lift of the outlet valve, and/or
(xviii) a position of a system for changing a compression of the internal combustion engine, and/or
(xix) a fuel quantity of injections of the internal combustion engine, and/or
(xx) an injection timing of the injections, and/or
(xxi) a pressure in a fuel high-pressure accumulator, and/or
(xxii) a coolant temperature of the internal combustion engine, and/or
(xxiii) a temperature in an intake system of the internal combustion engine.

21. The computer as recited in claim 16, wherein the operating variables include at least one of the following:
(i) an accelerator pedal position of the motor vehicle, and/or
(ii) a brake pedal position of the motor vehicle, and/or
(iii) a position of a clutch of a transmission of the motor vehicle, and/or
(iv) a gear of the transmission, and/or
(v) a speed of the motor vehicle, and/or
(vi) a driving resistance of the motor vehicle, and/or
(vii) a tractive force of the internal combustion engine, and/or
(viii) a tractive force of an electromotive drive, and/or
(ix) a rotational speed of the internal combustion engine, and/or
(x) an airmass intake per unit time of the internal combustion engine, and/or
(xi) a pressure in an intake manifold of the internal combustion engine, and/or
(xii) a quantity of a high-pressure EGR (exhaust gas recirculation), and/or
(xiii) a quantity of a low-pressure EGR, and/or
(xiv) a timing of a closing an inlet valve, and/or (xv) a timing of an opening of an outlet valve, and/or
(xvi) a maximum valve lift of the inlet valve, and/or
(xvii) a maximum valve lift of the outlet valve, and/or
(xviii) a position of a system for changing a compression of the internal combustion engine, and/or
(xix) a fuel quantity of injections of the internal combustion engine, and/or
(xx) an injection timing of the injections, and/or
(xxi) a pressure in a fuel high-pressure accumulator, and/or
(xxii) a coolant temperature of the internal combustion engine, and/or
(xxiii) a temperature in an intake system of the internal combustion engine.

\* \* \* \* \*